United States Patent [19]

Isenberg

[11] 3,915,830

[45] Oct. 28, 1975

[54] SOLID ELECTROLYTE ELECTROCHEMICAL CELL WITH SELF CONTAINED REFERENCE

[75] Inventor: Arnold O. Isenberg, Monroeville, Pa.

[73] Assignee: Westinghouse Electric Corporation, Pittsburgh, Pa.

[22] Filed: June 12, 1974

[21] Appl. No.: 478,659

[52] U.S. Cl. ............................... 204/195 S; 136/153
[51] Int. Cl.² ......................................... G01N 27/46
[58] Field of Search ........ 204/1 T, 195 S; 136/86 F, 136/153, 120 FC

[56] References Cited
UNITED STATES PATENTS

| | | |
|---|---|---|
| 2,631,180 | 3/1953 | Robinson .............................. 136/153 |
| 2,847,493 | 8/1958 | Smyth et al. ......................... 136/153 |
| 3,300,344 | 1/1967 | Bray et al. ........................... 136/86 F |
| 3,578,578 | 5/1971 | Von Krusenstierna ........... 204/195 S |
| 3,597,345 | 8/1971 | Hickam et al. .................... 204/195 S |
| 3,661,647 | 5/1972 | Owens et al. ....................... 136/153 |
| 3,698,955 | 10/1972 | Lilly et al. ........................ 204/195 S |
| 3,711,394 | 1/1973 | Minushkin et al. ............... 204/195 S |
| 3,738,341 | 6/1973 | Loos ................................. 204/195 S |

FOREIGN PATENTS OR APPLICATIONS 1,081,545   8/1967   United Kingdom ............. 204/195 S Primary Examiner—T. Tung
Attorney, Agent, or Firm—M. P. Lynch

[57] ABSTRACT

A reference medium is completely enclosed within a solid electrolyte member to form a solid electrolyte electrochemical cell particularly suitable for in situ gas measurements.

1 Claim, 2 Drawing Figures

SOLID ELECTROLYTE ELECTROCHEMICAL CELL WITH SELF CONTAINED REFERENCE

BACKGROUND OF THE INVENTION

Due to the stringent requirements for pollution control, and the limited availability of fuel, there is an ever increasing effort to develop sensors capable of monitoring the composition of exhaust gases from internal combustion engines as well as stack gases from industrial process. A particularly useful basic measurement is that of the oxygen content of the exhaust and stack gases and the subsequent interpretation of this measurement to determine the presence of various combustibles. While numerous techniques and devices have been developed for measuring oxygen content, of which the solid electrolyte electrochemical cell is particularly desirable, the physical configurations of solid electrolyte devices currently available do not lend themselves to in-situ measurements of gas compositions. The requirement for a self-contained solid electrolyte electrochemical cell of minimum physical size is particularly apparent when considering the requirements for measuring exhaust gases from automobile internal combustion engines. Tubular or probe type devices requiring flowing gas references and the corresponding plumbing are not readily adaptable for installation in automobile exhaust systems.

SUMMARY OF THE INVENTION

There is disclosed herein with reference to the accompanying drawings, a solid electrolyte electrochemical cell wherein a stable reference such as that represented by a metal/metal oxide composition is totally contained within a solid electrolyte member. Suitable techniques for encapsulating or embedding a metal/metal oxide reference hermetically within the solid electrolyte member include chemical vapor deposition ion plating, sputtering, sintering and plasma spraying. Both methods are adaptable for mass production techniques. Another technique for developing the reference medium within the solid electrolyte member consists of sealing a metal, such as nickel, within the solid electrolyte member and diffusing oxygen through the solid electrolyte member to the nickel to develop a predetermined nickel/nickel oxide, stable oxygen reference medium. While the disclosure particularly refers to the metal/metal oxide reference medium, it is apparent that other stable reference media could be sealed within the solid electrolyte, such as oxygen gas or air reference medium.

An additional factor taken into consideration in developing a solid electrolyte electrochemical cell with a self contained reference is the matching of thermal coefficients of expansion of the reference medium with the solid electrolyte material. For instance, assuming that the solid electrolyte material consists of conventional stabilized zirconia it would then be advisable to introduce a small amount of zirconia into the metal/metal oxide reference medium to more closely match the thermal coefficients of expansion of the reference medium with that of the solid electrolyte material.

DESCRIPTION OF THE DRAWINGS

The invention will become more readily apparent from the following exemplary description in connection with the accompanying drawing.

DESCRIPTION OF THE PREFERRED EMBODIMENT

Figure 1:
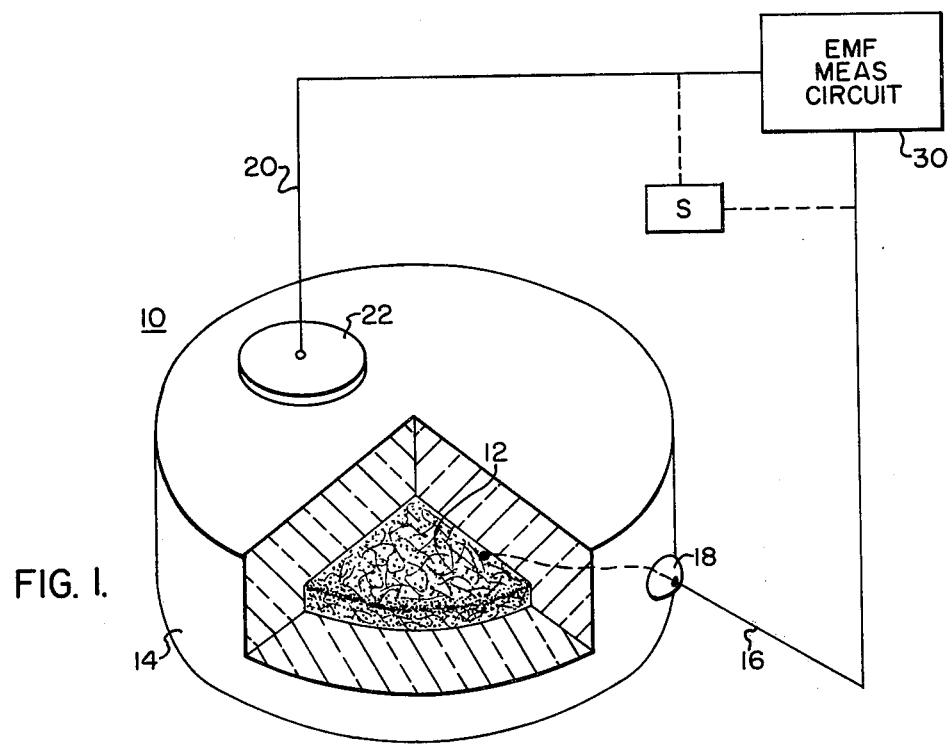
FIG. 1 is a partial section schematic illustration of an embodiment of the invention.

Referring to FIG. 1 there is disclosed a partial section view of solid electrolyte electrochemical cell 10 consisting of a reference medium 12 totally sealed or encapsulated within a solid electrolyte member 14. An electrode lead 16 in electrical contact with the reference medium 12 extends through the solid electrolyte member 14 and exits the solid electrolyte member 14 through a seal 18. In addition to the electrode lead 16 which contacts the reference medium, there is illustrated a second electrode lead 20 which is connected to electrode 22 which is disposed in intimate contact with the outer surface of the solid electrolyte member 14. The electrode leads 16 and 20 are connected to an electrical measuring circuit 30.

The seal 18 is of a material composition exhibiting negligible oxygen ion conductivity, such as glass. The use of this type of seal eliminates an electrode effect at the interface of the electrode lead 16 and the exterior surface of the solid electrolyte member 14 which is exposed to the unknown gas environment being measured.

In the application the solid electrolyte electrochemical cell 10 for measurement of the oxygen content of an unknown environment contacting the exterior surface of the solid electrolyte member 14, the reference medium 12 can be represented by a metal/metal oxide composition exhibiting a stable oxygen activity whereby the solid electrolyte electrochemical cell 10 generates a voltage signal which is a function of the difference between the oxygen content of the reference medium 12 and the oxygen content of the unknown environment. This mode of operation is well known in conventional solid electrolyte oxygen analyzing devices and is described in detail in both cell composition and operation in U.S. Pat. No. 3,400,054 which is assigned to the assignee of the present invention.

As indicated in the above referenced U.S. patent there are numerous solid electrolyte compositions suitable for oxygen measuring applications. The basic requirement for the solid electrolyte composition is that it exhibit substantial oxygen ion conductivity and negligible electronic conductivity. The most conventional solid electrolyte material utilized for oxygen measurement purposes consists of partially or fully stabilized zirconia.

The encapsulation of the reference medium 12 within the solid electrolyte member 14 can be achieved through numerous techniques. Assume for the purposes of discussion, that the reference medium is to consist of a metal/metal oxide. Available techniques for forming the solid electrolyte member 14 about the reference medium 12 include chemical vapor deposition, ion plating, sintering and sputtering. Of these techniques, the chemical vapor deposition technique generally provides an electrolyte composition with minimum impurity content and thus is considered to be the most desirable technique. A metal/metal oxide reference medium may be achieved by starting with a metal/metal oxide composition about which the electrolyte is disposed. Alternate methods involve the deposition of the electrolyte material about a metal or metal oxide composition. In the former situation oxygen is introduced into the metal composition by pumping oxygen from the external surface of the electrolyte into the reference medium. In the latter oxygen is pumped from the metal oxide compositions to form the metal/metal oxide reference. The oxygen pumping is accomplished by applying a potential from a source S through the electrode leads 16 and 20 of a polarity to produce oxygen ion diffusion either from or to the external surface of the electrolyte member 14 as the situation requires. Oxygen ion pumping is a technique which is well known in the art and is described in the above-referenced U.S. patent.

The requirement for operating conventional solid electrolyte electrochemical cells at temperatures in the range of 600° to 800°C introduces a requirement for controlling the volume change of the reference medium with respect to the solid electrolyte member in order to prevent cracking of the solid electrolyte material. This can be compensated for by assuring a porous metal/metal oxide reference composition which will support the volume change without damaging the solid electrolyte member. Additional compensation for differences between the thermal coefficients of expansion of the reference medium and the solid electrolyte member can be achieved by introducing electrolyte material into the metal/metal oxide reference composition. Assuming a stabilized zirconia solid electrolyte member, the reference medium could typically be represented as a porous cement of stabilized zirconia with a metal that is partially oxidized.

Further thermal stability is achieved when using a stabilized zirconia electrolyte by choosing platinum wire for the electrode lead 16. The thermal coefficient of expansion of platinum corresponds favorably with that of zirconia.

In addition to the wide variety of solid electrolyte compositions available, the metal/metal oxide compositions suitable for use as a stable reference medium are likewise numerous. In addition to the nickel/nickel oxide reference medium identified above, other reference mediums suitable include copper/copper oxide, cobalt/cobalt oxide and chromium/chromium oxide.

Figure 2:
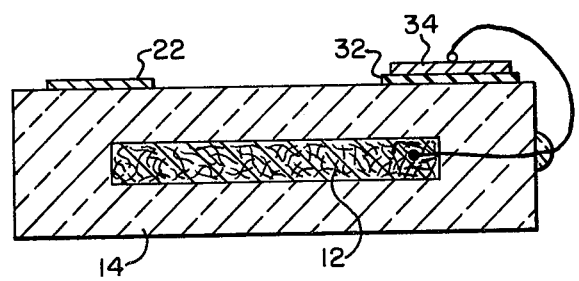
FIG. 2 is an alternate embodiment of the invention illustrated in FIG. 1.

In FIG. 2, there is illustrated an alternate configuration of the electrochemical cell of FIG. 1 wherein an insulating layer 32 is disposed in contact with the exterior surface of the solid electrolyte member and an electrical contact 34 is disposed on the surface of the insulating layer remote from the solid electrolyte material. This configuration provides a more integral, compact electrochemical cell. The requirement for electrically isolating the electrical contact 34 from contacting the solid electrolyte member prevents an effective "short circuit" between the electrical contact 34 and the reference electrode 12. Suitable insulating material for use as the insulating layer 32 includes alumina.

While the preferred embodiment described above represents an electrochemical cell composition for monitoring the oxygen content of an unknown environment, such as automobile or industrial stack gases, it is apparent that the concept of totally enclosing a reference medium within a solid electrolyte member to produce a self-contained electrochemical cell structure for monitoring gas composition of an environment is equally applicable to electrochemical cell sensors designed for monitoring gas constituents other than oxygen.

I claim:

1. An electrochemical cell configuration comprising a disc-shaped solid electrolyte member exhibiting significant anion conductivity and negligible cation conductivity, and having a hollow core therein enclosed on all sides by said electrolyte member, a metal/metal oxide porous reference medium of relatively stable oxygen activity located within the hollow core of said disc-shaped solid electrolyte member and in intimate contact therewith, an electrode disposed in intimate contact with a first portion of the external surface of said disc-shaped solid electrolyte member, an insulating layer disposed in intimate contact with a second portion of the external surface of said disc-shaped solid electrolyte member, an electrical contact disposed in intimate contact with the surface of said insulating layer remote from said solid electrolyte member, and an electrical conductor means extending from electrical contact with said metal/metal oxide reference through a wall of said disc-shaped solid electrolyte member and connected to said electrical contact.

* * * * *